United States Patent Office 2,878,240
Patented Mar. 17, 1959

2,878,240

POLYMERIZATION OF OLEFINS TO SOLID POLYMERS

Louis Schmerling, Riverside, Ill., assignor to Universal Oil Products Company, Des Plaines, Ill., a corporation of Delaware No Drawing. Application December 24, 1956
Serial No. 630,095

10 Claims. (Cl. 260—93.7)

This invention relates to a process for polymerizing olefinic hydrocarbons, particularly ethylene, to form high molecular weight polymers, including the so-called "hard" polymers thereof which are useful in many of the fabricating arts, particularly for the manufacture of molded articles such as containers (bottles, bags, tubes, etc.), pipes, pliable toys, etc. and for the production of articles generally in which resinous and plastic materials are useful starting materials. More specifically, this invention concerns a process for the manufacture of high molecular weight polymerized olefin hydrocarbons, the polymerization of the olefinic monomer being effected in the presence of a particular combination of catalyst components, one of which is titanium oxide and the other components include (1) a metal selected from groups I and II of the periodic table and (2) a halide of aluminum.

It has been found that very desirable, chemically inert, pliable, tough, and tear resistant plastics of the class characterized as the polymeric olefins (referred to herein as "hard" polymers) may be produced by polymerization of a low molecular weight olefin monomer in a process involving special reaction conditions and a particular series of catalysts. The polymeric products of this invention have molecular weights substantially in excess of about 10,000 and softening points substantially above the boiling point of water, for example, in the region of from about 115° to about 140° C. and even higher. This class of hydrocarbon polymer is a particularly desirable raw material in the plastics and resin molding industries, because of the physical and structural stability of articles molded therefrom at temperatures above the boiling point of water, making the product especially adapted for use as starting materials in the fabrication of articles which are subjected to high temperatures during their use, such as articles which must be sterilized with hot water or steam (i. e., at temperatures in excess of 100° C.), and which must also possess sufficient structural rigidity at these temperatures to resist plastic deformation or resist change in shape from the original structure of the molded article. It is widely recognized that processes are now in use for polymerizing olefinic hydrocarbons for the production of polymers having stable structural properties at relatively high temperatures which approach the boiling point of water, but in many cases, such polymers undergo a permanent set when heated to temperatures in the region of 100° C. or become sufficiently soft at the latter temperaure to flow accompanied by permanent structural deformation. In contrast to such products of the prior art, the present olefin polymers maintain their shape and other structural characteristics at temperatures substantially in excess of the boiling point of water and, furthermore, are of sufficiently high softening point that the polymer may be heated at these temperatures without undergoing plastic flow deformation. Thus, such articles as combs, baby bottles, containers for infant's food, surgical tubing and other articles desired in breakage-resistant form and fabricated from the present polymeric material may be sterilized by placing the same in a steam bath or a hot water bath without suffering any substantial change in shape or size. The polymer product of this invention is also more desirable from the standpoint of hardness and toughness than polymeric olefins heretofore manufactured and possess substantially greater tensile strength and tear resistance than such products of the prior art. The improved properties in these respects are apparent in the production of molded machine parts which are subjected to mechanical wear, such as roller bearings, cams, gears and a multitude of other mechanical shapes and forms, the use of the present polymeric material in the fabrication of such parts providing structures having greatly enhanced resistance to wear, breakage and mechanical distortion than solid polymers of presently produced types.

In one of its embodiments the present invention relates to a process for polymerizing an olefinic hydrocarbon which comprises contacting said hydrocarbon at a temperature of from about 25° to about 250° C. and at a pressure within the range of from atmospheric to 2,000 atmospheres with a catalyst comprising a mixture of titanium dioxide, a metal selected from the left-hand columns of groups I and II of the periodic table and a halide of aluminum.

A more specific embodiment of this invention relates to a process for polymerizing ethylene to form a hard polymer thereof having a softening point above about 100° C. which comprises contacting an ethylene-containing gas with a catalyst comprising a mixture of titanium dioxide, a metal selected from the group consisting of the elements of the left-hand columns of groups I and II of the periodic table and a halide of aluminum at a temperature of from about 25° to about 250° C. and at a pressure of from 5 to about 100 atmospheres.

Other embodiments of this invention relating to specific aspects of the above process for polymerizing olefinic hydrocarbons will be referred to in greater detail in the following further description of the invention.

The polymeric products of this invention are essentially high molecular weight hydrocarbons formed by polymerizing or condensing olefinic hydrocarbons of lower molecular weight by means of the process referred to generally as a polymerization reaction, effected under such conditions and for a period of time sufficient to form hydrocarbons having molecular weights substantially in excess of about 10,000, generally in the region above about 30,000, depending upon the olefinic monomer utilized as the starting material. The charging stock to the present polymerization process is a mono-olefinic hydrocarbon or a mixture of hydrocarbons containing at least a small proportion of olefinic hydrocarbons having up to about 8 carbon atoms per molecule, although under certain reaction conditions, homologs of the above (i. e., higher molecular weight monomers, or recycled low molecular weight fractions of a preceding polymerization process may be employed as charging stock. The mono-olefins of low molecular weight, particularly ethylene, are preferred herein as starting materials because of their tendency to polymerize into hydrocarbons of essentially straight-chain structure, the polymeric products therefrom being particularly resistant to chemical attack (such as, oxidation by atmospheric oxygen) and of higher molecular weight than the branched-chain polymeric products formed by polymerizing propylene and other homologs of ethylene. Further, 1-alkenes, such as 1-butene and 1-pentene, are especially preferred over their isomers such as 2-butene and 2-pentene. Also, the straight-chain alkenes are preferred over their branched-chain isomers such as 2-methylpropene and 2-methyl-1-butene. The olefin monomer may be charged to the process either individually (that is, as a substantially pure olefin monomer of specific structure) or in admixture with other olefins, such as, for example, the mixture of $C_2$–$C_4$ olefins separated from the light gaseous product of a thermal cracking process or in admixture with other hydrocarbons, such as paraffins and cycloparaffins which may be present in the above indicated light gases of a thermal cracking process or which may be formed by the dehydrogenation of paraffins. Cycloalkenes, such as cyclohexene, may also be utilized, either individually or in admixture with other olefins or other types of hydrocarbons. In other instances low molecular weight mono-olefins, particularly ethylene, may be mixed with a normally liquid hydrocarbon, such as cyclohexane, isopentane, or heptane to provide a reaction mixture in which the saturated hydrocarbon acts as a diluent of the olefin monomer which undergoes polymerization and is essentially the active ingredient of the hydrocarbon mixture. Such diluents may range from normally liquid materials which are relatively inert in the reaction, such as the normal paraffins, to materials which are not necessarily inert in the process, such as an aromatic hydrocarbon (e. g., benzene, toluene, xylene, etc.) or a haloaromatic compound (such as chlorobenzene, p-chlorotoluene, etc.) and which may undergo various side reactions with the olefin reactant or its polymer, such as mono- or polyalkylation reactions, etc.), a nitroparaffin (e. g., nitromethane, nitrobutane, etc.) and other materials which dilute the mono-olefin reactant, disperse the same in its contact with the catalyst, and thereby alter the physical properties and particularly the ultimate molecular weight of the polymer product formed during the course of the polymerization reaction.

The essential component of the present reaction which accounts for the production of the selective polymeric material referred to herein as "a hard polymer" is the particular mixture comprising the present catalyst, including: titanium dioxide, a metal selected from the group consisting of the elements of the left-hand columns of groups I and II of the periodic table (herein generally referred to as an "alkaline metal"), and a halide of aluminum.

The aluminum halide may be added to the catalyst mixture as such, for example, in the form of anhydrous aluminum trichloride, aluminum tribromide, aluminum trifluoride or aluminum tri-iodide (in the order of preference), as an aluminum dibromochloride, aluminum dichlorofluoride or any of the other various acid-acting aluminum mixed trihalides. Aluminum chloride is generally preferred herein because of its high order of effectiveness in promoting the desired polymerization reaction and further, because of its relative abundance and low cost. Suitable catalysts are those in which the aluminum halide (dependent upon the particular halide selected) is present in from about 0.1 to about 10 moles per mole of alkali or alkaline earth metal, the preferred catalyst mixtures containing from about 0.5 to about 2.0 moles of aluminum halide per mole of alkaline metal.

The ingredient of the catalyst composition herein referred to as titanium dioxide may be supplied from naturally occurring sources (such as the mineral, rutile, preferably heated to drive off any physically retained moisture) or the oxide may be supplied as a synthetically prepared material (for example, the oxide formed by burning pure metallic titanium in a stream of oxygen or the oxide formed by precipitating titanium hydroxide from an aqueous solution of a titanium salt, followed by heating to drive off water of crystallization and/or water of hydration from the precipitated hydroxide). The titanium dioxide is desirably present in the form of finely divided particles, for example, in a finely powdered condition, in order to increase the amount of catalytic surface available for exposure to the other components of the catalyst and to the olefinic monomer reactant. The titanium oxide desirably constitutes a major constituent of the catalyst mixture, although amounts of the oxide as low as 1 to 2% by weight of the catalyst mixture and as high as 70 to 80% by weight of said mixture may likewise be employed, but not necessarily with the same degree of effectiveness as a catalyst mixture containing the preferred ratio of components, the preferred catalysts containing from about 30 to about 60% by weight of titanium dioxide, from 0.01 to about 10% by weight of aluminum halide and from 1% to about 40% by weight of the metallic component selected from the alkali and alkaline earth metals.

The component of the catalyst composition herein referred to as a metallic element selected from the group consisting of the left-hand members of the elements of groups I and II of the periodic table are the so-called "alkali metal" and "alkaline earth" metals, including particularly the following: lithium, sodium, potassium, rubidium and cesium of the alkali metals and beryllium, magnesium, calcium, strontium and barium of the alkaline earth metal series. Of the above elements generally utilizable in the present process, sodium, potassium, magnesium and calcium are generally preferred because of their high order of effectiveness, their ready availability and their relatively low cost compared to other members of the above series of elements, sodium being preferred above all others in the above group. In some cases it is preferable to supply the alkaline metal to the reaction zone in the form of an organo-metallic complex of the alkali or alkaline earth metal, rather than in the form of unaltered metal itself and for this purpose the complexes of the above metals with aromatic hydrocarbons, particularly polynuclear hydrocarbons such as naphthalene, anthracene, phenanthracene, etc., and especially the complexes of lithium and sodium may be preferred. The metallic component of the catalyst, whether utilized in the form of the metal itself or in the form of an organo-metallic complex is preferably in a finely divided form in order to increase to a maximum the surface of the metal exposed to the reactants and to the other components of the catalyst, thereby enhancing the rate of reaction and the yield of the resulting product. In most instances the present reaction mixture is vigorously stirred, and the temperature of the reaction is maintained above the melting point of the alkali or alkaline earth metal component of the catalyst; therefore, the metal is generally present in the reaction in its liquid form and generally dispersed in a relatively fine state of subdivision in the form of droplets. At other reaction conditions and for alkali metal and alkaline earth metals which are not in their liquid form at the particular reaction conditions utilized, the metal may be supplied to the reaction zone in the form of a powder, finely divided chips, turnings or other special fabricated shapes which present a large surface area per unit weight or volume.

It is believed that the effectiveness of the present catalyst in promoting the end-of-the-chain polymerization (that is, continuous and successive condensation of the pre-existing polymer with the monomer undergoing reaction therewith) is dependent upon an oxidation-reduction reaction occurring between titanium oxide, the alkali or alkaline earth metal and the aluminum halide components of the catalyst mixture, the transfer of electrons characterizing the oxidation-reduction phenomenon and which at the active, catalytic centers between the particles of titanium oxide, aluminum halide and the metallic component activates the olefin monomers, resulting in a condensation with another monomer or with a previously formed polymer which also has a resident double bond. It is considered essential, therefore, that the reaction mixture containing the catalyst and olefin monomer, as well as the previously formed polymer, be thoroughly agitated to promote the reaction and maintain the catalyst at a high level of catalytic activity. In general, the number of active centers at which polymerization occurs in the reaction mixture increases as the intimacy between the catalytic components increases through agitation and stirring. A particularly preferred type of reaction vessel for the present polymerization process, therefore, is a stirred or rotating autoclave wherein the catalyst and monomer olefin reactants are intimately contacted at the present selective reaction conditions.

The present process is operable with mixtures of the above-indicated catalytic components supplied in their substantially pure condition; however, one or more members of the same group of components, such as two or more alkali metal and/or alkaline earth metals may be combined to provide the alkaline metal catalyst component. Thus, a mixture of sodium and potassium in any proportion or a mixture of sodium and magnesium or other alkali metal with any other alkaline earth metal may be supplied to the reaction zone for purposes of the present process.

Polymerization of the olefinic hydrocarbon charge stock yields the present "hard" polymer when the reaction is effected in the presence of the specific catalyst herein provided and at selective reaction conditions, although for certain purposes "soft" polymers having the characteristics of petroleum waxes or even liquid polymers may be desired and produced as a predominant product of the present process, albeit at other reaction conditions. Although polymerization of the olefin monomer may generally be effected at atmospheric pressure, it is usually preferred to carry out the polymerization at a superatmospheric pressure, up to about 200 atmospheres (preferably from about 100 to about 1500 p. s. i.), the preferred pressure in each instance being dependent upon the type of product desired and also upon the particular hydrocarbon charge stock. Suitable temperatures for obtaining the desired hard polymers are within the range of from about room temperature (that is, at about 20° C.) up to temperatures in the region of 300° C., and preferably, from about 80° to about 225° C. As in the case of the pressure variable, the required reaction temperature is dependent upon the character of the olefinic feed stock, the presence or absence of a diluent in the reaction mixture, and the manner of contacting the charge stock with the catalyst, as well as the type of ultimate product desired.

It is usually desirable to carry out the polymerization in the substantial absence of air or oxygen, but hydrogen may be present in the reaction zone, particularly if a wax-like, semi-solid or liquid polymer product is desired.

The solid alkaline metal, the aluminum halide and the titanium oxide components of the catalyst, as well as the olefinic hydrocarbon charge stock exist in various physical states within the reaction mixture at various temperatures and pressures, but it is the mutual co-action between the various components of the catalyst and the contact of the hydrocarbon feed stock with the catalytic components and particularly the maintenance of the specific polymerization reaction conditions during their indicated co-action in the presence of each other which results in the production of the present "hard" type of polymer herein desired as product, at the selective reaction conditions of the present process. In order to obtain such co-action the olefinic hydrocarbon in gaseous or liquid phase is contacted with the catalyst at the above reaction conditions and while the mixture is so agitated that the surface of the alkaline metal is in contact not only with the surface of the titanium oxide powder but also with the aluminum halide. Generally, the reaction is most rapid and proceeds toward completion to the greatest extent when the reaction mixture containing the solid catalytic components is rapidly stirred so as to provide a continuously exposed fresh surface of titanium oxide, aluminum halide and alkaline metal to the action of the surrounding olefin monomer. In many instances, after the initial formation of polymer within the reaction zone, additional polymer continues to form around such active centers of polymerization, possibly even without actual contact with fresh catalytic components. The catalyst is believed to act by virtue of reducing the activation energy required for the formation of the initial polymer, subsequent polymerization taking place by virtue of what may be referred to as a "chain reaction" involving the condensation of vicinal molecules of monomer on the end of the chain of the previously formed polymer, thereby building up long chains of polymers of extremely high molecular weight.

The present process, although particularly adapted to batch-type methods of operation for effecting the reaction, may also be conducted under continuous polymerization techniques wherein the charge stock is continuously passed through a reaction zone containing the catalyst (such as an elongated tubular reactor in which the catalyst is placed on the inside walls of the tube or which contains the catalyst loosely packed as a porous bed within the tube), the polymer formed therein being removed by mechanical means and additional feed stock continuously supplied to the reaction zone as the polymer is removed.

As heretofore indicated, the present products are obtained only by virtue of the polymerization catalyst and the particular reaction conditions coupled therewith and utilized in the present process, the specific catalyst being capable of forming the polymer only by virtue of its composition. These "hard" polymers are normally solid materials having softening points considerably above the boiling point of water, generally above about 125° C., and in certain instances the products soften only at much higher temperatures and thus exist in the form of horn-like materials which are extremely hard but which are sufficiently elastic and tough to resist breakage and cracking even at relatively low temperatures. The refractory properties of the present polymers make them particularly suitable for use in applications where the maintenance of structural shape and contour at relatively high temperatures is particularly desirable, as in the case of reaction vessels heated to high temperatures by superheated steam. The present products are generally mixtures of polymers of various molecular weights usually averaging above about 10,000 and mostly above about 50,000, a major proportion of the product having a molecular weight within the range of 100,000 to 500,000; smaller proportions of the product may be of even higher molecular weight. The product may be separated into fractions corresponding to certain ranges of molecular weights by extracting the mixed polymer product with various solvents in which the individual fractions are selectively soluble. The lower molecular weight fractions are generally plastics which are more pliable and softer than the high molecular weight polymers which are harder and more structurally rigid. Thus, a relatively low molecular weight fraction may be separated from the mixed polymer product by extracting the latter with an aromatic hydrocarbon, leaving a fraction of higher molecular weight material having different properties than the fraction thus extracted. As the mixed, crude polymer product is extracted with a solvent in which the low and intermediate molecular weight polymers only are soluble at an elevated temperature, the high molecular weight or "hard" polymers are left as a residue in such an extraction, the lower molecular weight polymers dissolve in the solvent while it is hot and when such solution is cooled, it is generally found that the intermediate molecular weight polymers precipitate from solution while the lowest molecular weight fractions (greases, waxes, etc.) remain dissolved in the solvent. Suitable solvents of this type capable of effecting such a fractional separation are the liquid hydrocarbons and particularly the aromatic hydrocarbons, such as toluene and xylene. Other solvents which may be utilized to selectively remove other fractions, such as the low molecular weight greases and waxes from the intermediate and higher molecular weight polymers, include the low molecular weight alkyl halides, dihalides and polyhalides, for example, ethyl chloride, ethyl bromide, ethylene dichloride, ethylene dibromide, trichloropropane, chloroform, carbon tetrachloride, perfluorobutane, etc.

This invention is further illustrated with respect to several of its specific embodiments in the following examples which are presented for illustrative purposes only with no purpose of limiting the scope necessarily in accordance therewith.

Example I

A solid ethylene polymer was prepared in accordance with the process of this invention by polymerizing ethylene at a superatmospheric pressure and at an elevated temperature in the presence of a catalyst comprising a mixture of aluminum chloride, sodium metal and titanium dioxide. For this purpose 5 grams of sodium chips, 10 grams of powdered titanium dioxide and 5 grams of aluminum chloride were charged into the glass liner of a rotating autoclave, the autoclave thereafter flushed with nitrogen, the liner sealed into the autoclave, and the apparatus again flushed twice with nitrogen, followed by charging ethylene into the liner to a pressure of 42 atmospheres. The autoclave was thereafter heated to 248° C. for 5.5 hours at which temperature the pressure increased rapidly to 63 atmospheres and the temperature increased to 250° C. After cooling to room temperature, the final pressure within the autoclave was 22 atmospheres. The autoclave was then opened and the product inspected; it consisted of a granular, hard amber colored solid containing unreacted sodium. The sodium and aluminum chloride were removed by treatment of the reaction product mixture with absolute ethanol mixture and after a reaction which continued for several minutes, the ethanol solution was drained from the solid polymer and the remaining residue washed with a small amount of absolute alcohol. The washed residue consisted of 40 grams of a greyish white, hard polymer which has a very high softening point (above about 300° C.) and which when subjected to a pressure of 10,000 p. s. i. in a Clark press at 155° C. yielded a very tough, flexible sheet containing portions of unmelted polymer. At a pressure of 20,000 p. s. i. and at a temperature of 165° C., the plastic sheet obtained was of uniform composition and very tough and flexible. At the high pressure and temperature, the sheet was of greater uniformity than the plastic sheet formed at 10,000 p. s. i. and 155° C.

The fact that the three components of the catalyst mixture are essential to the production of the indicated hard polymer, was demonstrated in the following series of reactions:

(a) A reaction similar to the above was performed, that is, utilizing the indicated quantities of catalytic components, except that aluminum chloride was omitted, the reaction otherwise being identical. The reaction did not proceed when the mixture was heated to a temperature of 240° C., at the above-indicated pressure. The fact that little or no reaction occurred was indicated by the complete absence of liquid or solid polymer in the autoclave when the contents of the latter were cooled to room temperature. The ethylene, therefore, was recovered in substantially unaltered condition.

(b) A liquid polymer was obtained when sodium (5 grams) and aluminum chloride (5 grams) were mixed and utilized as the catalytic component of the reaction mixture. In this reaction the above catalyst ingredients were charged into the rotating pressure autoclave, flushed twice with nitrogen, followed by charging ethylene into the autoclave to a pressure of 42 atmospheres and heating the contents of the reactor to a temperature of 250° C. The reaction was continued for 5 hours and after discharging the remaining ethylene and nitrogen from the reactor, 15 grams of crude product were recovered in the form of a liquid from which the solid sodium and aluminum chloride may be recovered by filtration. Distillation of the liquid product indicated that it consists predominantly of hydrocarbons boiling below about 300° C. and a small residue of tar.

(c) A liquid polymer is obtained in a reaction effected at identical reaction conditions as the three-component catalyst reaction indicated above, except that sodium is omitted from the catalyst mixture. Thus, when 10 grams of titanium dioxide and 10 grams of aluminum chloride are charged into the glass liner of the 850 cc. rotating pressure autoclave, the reactor flushed twice with nitrogen and thereafter ethylene added thereto to a pressure of 42 atmospheres, followed by heating the resulting mixture to a temperature of 150° C., a reaction occurred which, however, was less vigorous than the first-mentioned reaction catalyzed by the three-component catalyst. The maximum pressure was 48 atmospheres. After cooling to room temperature, the autoclave was opened and 18 grams of liquid polymer recovered. The liquid hydrocarbons recovered from the solid catalyst components when distilled yielded hydrocarbons predominantly boiling below about 300° C. and a tarry residue in the distillation flask.

(d) The fact that reaction does not involve the formation of titanium tetrachloride is indicated by the results obtained when a mixture of 5 grams of sodium and 10 grams of titanium tetrachloride is utilized as the catalyst in a reaction otherwise identical to the reaction catalyzed by the three-component catalyst, that is, utilizing ethylene at a pressure of 42 atmospheres and heating the reaction mixture to a temperature of 250° C. In the latter reaction substantially no polymeric material of either a liquid or solid type is produced in the process.

Example II

Calcium metal powder (5 grams), 10 grams of titanium dioxide powder and 5 grams of aluminum chloride were charged into a rotating pressure autoclave, flushed with nitrogen, and thereafter charged to 65 atmospheres pressure with ethylene. As the temperature of the autoclave was increased to 40° C. the pressure suddenly increased to 172 atmospheres and the temperature to 250° C. After a reaction period of 5½ hours and cooling to room temperature, the pressure was 55 atmospheres. A liquid product, in the amount of 17 grams, which was recovered from the autoclave, distilled over a considerable range of boiling points and deposited a tarry residue.

Example III

A mixture of 10 grams of magnesium turnings, 10 grams of titanium dioxide powder and 5 grams of aluminum chloride in a glass liner was sealed into a rotating autoclave of 850 cc. capacity. Ethylene was charged into the pressure autoclave (after flushing with nitrogen) to a pressure of 65 atmospheres. The autoclave was slowly heated to 90° C. during two hours and kept at that temperature for an additional five hours. The pressure dropped to 24 atmospheres at the end of this time and the final pressure after cooling the reactor to room temperature was 9 atmospheres. The product which filled the liner consisted of 97 g. of yellow to amber solid granules together with a hard solid mass which was recovered from the bottom of the liner. The yellowish granules which weighed about 47 g. were ground to a powder and screened. There was obtained 36 g. of material, finer than 20 mesh, which softened at about 140–170° C. and remained gummy up to 300° C. Soxhlet extraction of this powder yielded greyish-white granules which yielded flexible sheet when pressed in a Clark press at 160° C. and 10,000 p. s. i. Similarly, Soxhlet extraction of the hard mass yielded white granules which softened at about 140° C. and yielded a semi-transparent translucent amber sheet of good flexibility when pressed in the Clark press at 160° C. and 10,000 p. s. i.

The above reaction effected in the presence of 100 grams of p-chlorotoluene as diluent, yielded 73 grams of solid polyethylene.

Example IV

When ethylene at 61 atmospheres initial pressure was heated to 250° C. in the presence of a mixture of 10 g. each of titanium dioxide and zinc dust and 5 g. of aluminum chloride using the procedure described in Example III, there was formed 23 g. of granular polymer, wet with a small amount of oil.

Example V

A mixture of 5 grams of sodium, 10 grams of titanium dioxide and 5 grams of aluminum chloride were charged into a rotating pressure autoclave, followed by flushing the autoclave and liner with nitrogen gas and thereafter charging propylene into the autoclave to a pressure of 12 atmospheres. The reactor and its content were then heated to 32° C., the pressure reaching a maximum of 16 atmospheres at a maximum temperature of 117° C. After cooling to room temperature the pressure was 1 atmosphere. The product consisted of 86 grams of a soft polymer which when extracted with toluene yielded 54 grams of a hard polymer having a melting point above about 135° C. and a liquid material of high viscosity and high boiling point.

I claim as my invention:

1. A process for polymerizing an olefinic hydrocarbon which comprises contacting said hydrocarbon at a temperature of from about 25° to about 250° C. and at a pressure from atmospheric to 2,000 atmospheres with a catalyst comprising a mixture of titanium dioxide, a metal selected from the group consisting of the alkali metals and alkaline earth metals, and a halide of aluminum.

2. The process of claim 1 further characterized in that said temperature is from about 80° to about 225° C.

3. The process of claim 2 further characterized in that said olefinic hydrocarbon comprises ethylene.

4. The process of claim 2 further characterized in that said olefinic hydrocarbon comprises propylene.

5. The process of claim 2 further characterized in that said metal is sodium.

6. The process of claim 2 further characterized in that said halide of aluminum is aluminum chloride.

7. The process of claim 2 further characterized in that said reaction is effected in the presence of a diluent comprising a paraffinic hydrocarbon.

8. The process of claim 2 further characterized in that said metal is magnesium.

9. The process of claim 2 further characterized in that said olefin is propylene.

10. A process for polymerizing ethylene to produce a hard polymer which comprises contacting an ethylene-containing gas at a temperature of from about 25° to about 250° C. and at a pressure of from about 5 to about 100 atmospheres with a catalyst consisting of titanium dioxide, sodium and aluminum chloride.

References Cited in the file of this patent

UNITED STATES PATENTS

| 1,877,664 | Howes | Sept. 13, 1932 |

FOREIGN PATENTS

| 874,215 | Germany | Aug. 20, 1953 |
| 534,792 | Belgium | Jan. 31, 1955 |